3,310,356
LENS PROTECTIVE DEVICE UTILIZING DUAL AIR STREAMS

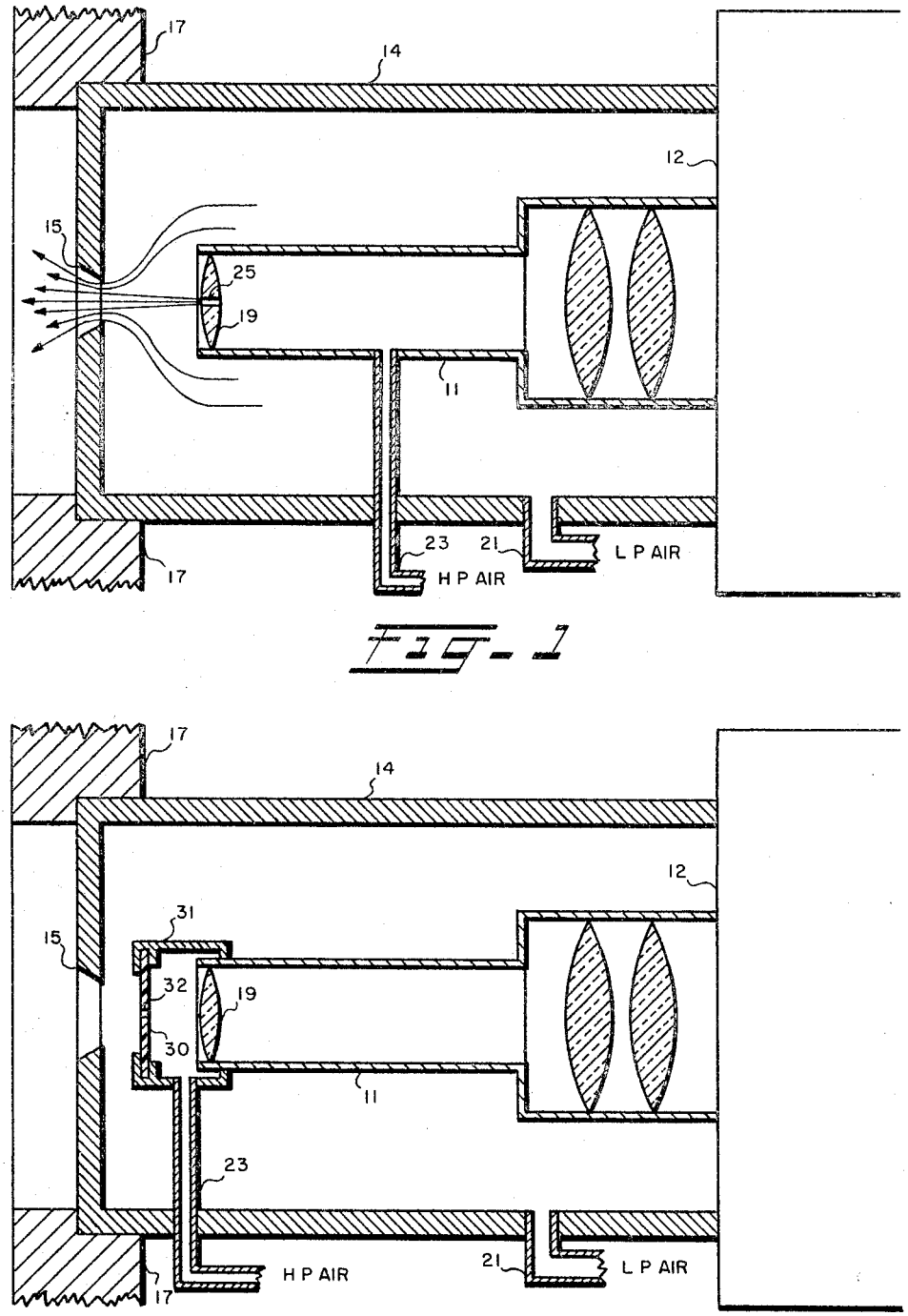

Willy Borberg, Briarcliff Manor, N.Y., assignor to General Precision, Inc., a corporation of Delaware
Filed Feb. 8, 1963, Ser. No. 257,301
1 Claim. (Cl. 350—63)

This invention relates to lens systems and more particularly to a protective device for lens systems which when utilized in certain environments are subject to damage by high temperatures and bombardment by foreign objects.

Closed circuit television has made possible the remote monitoring of industrial processes by a single individual and has thus contributed to substantial labor savings. However, in those instances where extreme temperatures or other adverse operating conditions such as particle bombardment exist, their application has been limited by the amount of protection which may be employed to prevent damage to the camera and its lens.

One such area where difficulty has been encountered is in the monitoring of the interior of steam generators used in power generating plants. In this instance temperatures of approximately 2000° Fahrenheit and bombardment by slag, ash, and other hot particles requires the use of various protective devices.

In the first instance the lens must be located in the furnace wall in order to view the interior. It is therefore subject to ambient temperatures approximately 2000° as well as direct radiation from the burners. This requires a cooling system, preferably air, which will maintain the lens and associated equipment at approximately 140° Fahrenheit.

In addition the lens surface exposed to the interior of the furnace is subjected to bombardment by slag, ash, and other particles which are the by-products of combustion. These particles are at the furnace temperature and become welded onto the lens rendering it inoperative after a few days of use.

In prior installations an inexpensive transparent protective shield was placed between the furnace interior and the lens surface. This necessitated the changing of the shield every few days at considerable cost due to the inaccessibility of the lens and the extreme difficulties encountered in changing the shields.

One object of this invention is to provide a lens protective device which is effective against particle bombardment and requires no regular or periodic replacement.

Another object of the invention is to provide a protective device for a lens as set forth above which in addition to affording protection against bombardment by foreign particles aids and assists the lens cooling system.

The invention contemplates a protective device for a lens system which in use may be subjected to high temperatures and bombardment by high temperature particles.

The foregoing and other objects and advantages of the subject invention will become more apparent from a consideration of the drawings and specification wherein two embodiments of the invention are shown and described for illustration purposes only.

In the drawings:

FIGURE 1 is a cross section of a lens system employing the novel invention, taken on a plane through the optical axis of the lens system; and, FIGURE 2 is a similar view of another embodiment of the invention.

In FIGURE 1 a lens system mounted in stepped tubular housing 11 is supported by the housing 12 of a television camera. A cylindrical protective cover 14 is also supported by housing 12 and completely encompasses the tubular housing 11. It is provided with a conical viewing aperture 15 which permits only the minimum viewing angle necessary when the cover 14 is inserted in the wall 17 of the furnace.

It is absolutely essential that aperture 15 be maintained at a minimum in order to reduce as much as possible the effects of direct radiation on the first lens element 19 of the lens system mounted in tubular housing 11. Cool air under pressure from a source not shown is admitted to the interior of cover 14 via a conduit 21.

The arrangement thus far described is conventional and well known in the art. In the prior art devices the cool air admitted via conduit 21 passes over the outer surface of tubular housing 11 and through viewing aperture 15 into the furnace thus maintaining the optical system within permitted temperature ranges. However, with this arrangement a low pressure area is created in front of lens 19 which attracts the bombarding particles of slag and ash. The prior art devices inserted a relatively inexpensive shield in this area to intercept the particles and prevent permanent damage to element 19. While this arrangement works it necessitates the periodic changing of the shield which entails a great deal of costly labor.

According to the invention cool air at a pressure higher than that of the air admitted to the interior of cover 21 is conducted to the interior of tubular housing 11 through a conduit 23. This high pressure air escapes through an orifice 25 which extends through the element 19. The orifice 25 is coaxial with the optical axis of the lens system and in cooperation with the high pressure air supplied via conduit 23 creates a high velocity area of air movement in front of element 19. The two air paths establish a substantially uniform circular air velocity gradient in front of lens element 19 with highest velocity occurring in substantial alignment with the optical axis of the lens system i.e., a velocity gradient which decreases substantially uniformly along radii extending normal to the optical axis. The air velocity is such that it provides a curtain in front of element 19 which stops the particles of slag and ash which would otherwise permanently damage element 19.

Orifice 25 will degrade the lens performance since it will create a halo and in addition result in a loss of speed due to the reduction in lens area. However, the level of illumination is not a problem, in this instance, and the quality of the picture for its intended use is unaffected by the halo produced by the orifice 25.

The embodiment illustrated in FIGURE 2 overcomes both effects listed in the above paragraph. In this embodiment a transparent shield 30 is supported in front of lens element 19 by a holder 31 attached to tubular housing 11. The high pressure air in conduit 23 is admitted to the rear side of shield 30 through holder 31 and escapes through an orifice 32 in shield 30. Orifice 32 and the high pressure air afford the same protection to transparent shield 30 as was provided for lens element 19 in the embodiment of FIGURE 1. However, orifice 32 is now optically inert and causes no reduction in speed or reproduction of a halo.

This embodiment is, notwithstanding its advantages, limited in application since it requires a larger aperture 15 to achieve the same field of view. Therefore it subjects the lens structure to a larger amount of radiant energy. Thus it may only be used in those instances where a small field of view only is necessary or where the size of aperture 15 is not critical due to reduced intensity of radiation.

In all of the embodiments thus far described the fluid used for establishing the curtain in front of the forward element of the lens system is air. However, it may be advantageous in certain applications to utilize other fluids such as helium, if an inert gas is desired, or nitrogen. In fact, if severe operating temperatures are involved and more efficient cooling is desired or a curtain offering greater protection is desired, a refrigerated liquid may be used, in which case the liquid in contact with the lens becomes part of the lens system. After ejection through the orifice the liquid vaporizes and thus will not interfere with transmission of the image.

While two different embodiments of the invention have been shown and described in detail for illustration purposes, applicant wishes it clearly understood that his invention is not limited to the specific details disclosed.

What is claimed is:

A protective device for a lens system which in use may be subjected to high temperatures and bombardment by high temperature particles comprising, an elongated hollow tubular support member having a free end and a fixed end, a lens element of solid transparent material having at least one spherically curved surface normal to its optical axis, said lens element having an orifice extending coaxially therethrough relative to said optical axis and being mounted in substantially air-tight relation in and near said free end of said support member, a protective cover completely disposed about said support member in spaced apart relation, said cover including an aperture having a longitudinal axis, the longitudinal axis of said aperture being colinear with the optical axis of said lens element, means for admitting air under pressure to the interior of said cover defined by said spaced apart relation to create a flow of fluid along said support member and out said aperture, and means for admitting air within said hollow tubular support member under a higher pressure than the air being admitted to said cover interior, said last mentioned means creating a fluid flow through said orifice to provide a fluid curtain extending away from said support member's free end and through said aperture, said fluid curtain characterized by a velocity gradient decreasing substantially uniformly along radii extending normal to said lens element's optical axis with the highest velocity component being located substantially along said optical axis.

References Cited by the Examiner

UNITED STATES PATENTS 2,959,090  11/1960  Davies _____ 88—1

FOREIGN PATENTS

Ad. 76,713  10/1961  France.
1,240,625  8/1960  France.

DAVID H. RUBIN, *Primary Examiner.*

JEWELL H. PEDERSEN, *Examiner.*

R. J. STERN, *Assistant Examiner.*